United States Patent [19]

Hrassky

[11] Patent Number: 4,814,674
[45] Date of Patent: Mar. 21, 1989

[54] CONTROL CIRCUIT FOR A BRUSHLESS DC MOTOR

[75] Inventor: Petr Hrassky, Wasserburg, Fed. Rep. of Germany

[73] Assignee: SGS Halbleiter-Bauelemente GmbH, Grafing, Fed. Rep. of Germany

[21] Appl. No.: 29,909

[22] Filed: Mar. 25, 1987

[30] Foreign Application Priority Data

Mar. 26, 1986 [DE] Fed. Rep. of Germany ....... 3610253

[51] Int. Cl.$^4$ .............................................. H02P 6/02
[52] U.S. Cl. .................................................... 318/254
[58] Field of Search ........................ 318/138, 254, 439

[56] References Cited

U.S. PATENT DOCUMENTS

| 4,103,216 | 7/1978 | Hayes | 318/254 X |
| 4,107,594 | 8/1978 | Jacobs | 318/254 X |
| 4,270,074 | 5/1981 | Duckworth et al. | 318/254 |
| 4,510,422 | 4/1985 | Ogura | 363/49 X |

FOREIGN PATENT DOCUMENTS

| 0189676 | 8/1986 | European Pat. Off. | |
| 57-43588 | 3/1982 | Japan . | |
| 57-160385 | 10/1982 | Japan | 318/254 |
| 58-63088 | 4/1983 | Japan | 318/254 |
| 58-69489 | 4/1983 | Japan . | |
| 58-69490 | 4/1983 | Japan . | |
| 58-136291 | 8/1983 | Japan . | |
| 59-62960 | 10/1984 | Japan | 318/254 |
| 60-139189 | 7/1985 | Japan . | |

Primary Examiner—Bentsu Ro
Attorney, Agent, or Firm—Spencer & Frank

[57] ABSTRACT

A monolithically integrated control circuit (4) for a brushless DC motor (1) comprising a commutation signal source (3) controlled by rotational motor position signals, a driver circuit (TS) controlled in accordance with the commutation signals and serving for applying driving pulses, which result in a rotating magnetic field, to the motor windings, with one driver stage (15A, 15B, 15C, 15D) being provided for each motor winding phase, and comprising, furthermore, a pulse shaping circuit (10) effecting sloping of the driving pulse edges, with the pulse shaping circuit (10) being arranged upstream of the driver circuit (TS) and being connected to an external edge sloping impedance means ($C_A$, $C_B$), and the driver stages (15A, 15B, 15C, 15D) being designed as feedback-free amplifier stages fed with driver control pulses ($V_{CA}$; $V_{CB}$) that are sloped by means of the pulse shaping circuit (10).

22 Claims, 4 Drawing Sheets

CONTROL CIRCUIT FOR A BRUSHLESS DC MOTOR

BACKGROUND OF THE INVENTION

The present invention relates to a monolithically integrated control circuit for a brushless or commutatorless DC motor comprising a commutation signal source controlled by rotational motor position signals, a driver circuit controlled in accordance with the commutation signals and serving for applying driving pulses, which result in a rotating magnetic field, to the motor windings, with one driver stage being provided for each motor winding phase, and a pulse shaping circuit effecting sloping of the driving pulse edges.

Such a control circuit is suited for the control of brushless DC motors that must be controlled very exactly. A microcomputer is preferably used for motor control. Such motors are typically employed as head wheel motors of video recorders and driving motors for record players, CD players (compact disk players) and magnetic disk units, e.g. floppy-disk drivers.

Driving pulses are produced at the driver outputs of a control circuit for such a motor in such a sequence that a rotating magnetic field is created in the motor winding or coil. The time position of the individual driving pulses defines the commutation sequence, and the amplitude of the driving pulses defines the motor output.

A typical servo system for a four-phase brushless motor is shown in FIG. 1. It comprises the motor 1, a motor controller 3 as well as a control circuit 4. The motor 1 is provided with a position sensor $P_S$ and with a speed sensor $G_S$ supply rotational rotor position signals and, respectively, motor speed signals to the controller 3 via connecting lines 2. The controller 3 derives from the rotational motor position signals and from the motor speed signals an analog control signal 6 as well as commutation signals 5. These signals are fed to a signal processing circuit $S_V$ belonging to the control circuit 4. The signal processing circuit $S_V$ generates driver control pulses 12 and switching control pulses 14 which are fed to a driver circuit $T_S$ that also belongs to the control circuit 4. Four outputs 16A to 16D of the driver circuit $T_S$ are connected to winding terminals A to D of the motor 1. Between the controller 3 and the driver circuit $T_S$ there is provided a special function circuit $S_F$ effecting, for instance, a general release or a braking function.

Conventional control circuits produce at the driver outputs 16A to 16D rectangular driving pulses causing in the windings current pulses having a current path that depends on the amplitude of the driving pulses, the winding inductance and on the motor voltage (emf voltage). The rapid voltage and current changes at the driver outputs, caused by the rectangular driving pulses, lead to kick-back pulses or "flyback pulses" which are caused by a sudden magnetic discharge of an abruptly turned-off inductor as it is generally known.

Typical voltage and current patterns at the outputs of the driver circuit of a conventional control circuit are shown in FIG. 5a. $V_{OA}$ and $V_{OB}$ are the voltage patterns, and $I_{OA}$ and $I_{OB}$ are the current patterns at the driver outputs 16A and 16B. The current and voltage patterns belonging to driver output 16A are shown in full lines, and the current and voltage patterns belonging to driver output 16B are shown in the form of broken lines. The curves $V_{MA}$ and $V_{MB}$ represent the associated motor voltage patterns.

FIG. 5a shows the example for a driver circuit designed in "tri-state technology", i.e. a driver circuit having tristate outputs. For instance, the driver output 16A is in the H (High) state during the commutation clock period $T_1$, in the L (Low) state during the commutation clock period $T_3$ and in the open or high-impedance state during the remaining two commutation clock periods $T_2$ and $T_4$. The same holds for the driver output 16B, but with a time shift of one commutation clock period.

FIG. 5a clearly indicates the strong flyback pulses occurring when abruptly switching the driver outputs from the H state or L state, respectively, into the tri-state condition.

The flyback pulses cause problems. On the one hand, they cause a loud motor noise that is disturbing for the user of a video recorder for instance. On the other hand, due to their high frequency content the flyback pulses cause strong electromagnetic radiation. This may lead to considerable disturbances in the apparatus equipped with the motor as well as in other apparatus. In the case of a head wheel motor for a video recorder, the magnetic heads disposed on the head wheel are located in close proximity to this source of disturbing radiation.

In order to counteract such disturbances, a known control circuit for a brushless motor has an RLC filter connected between each driver output and the associated winding terminal of the motor. By means of these filters it is possible to slope the edges of the driving pulses reaching the motor winding. In this manner one can avoid the occurrence of electromagnetic disturbances on the lead wires to the motor windings as well as on the motor windings. However, due to the inductances of the RLC filters flyback pulses are still present at the driver outputs of the control circuit. Thus, disturbing electromagnetic radiation still occurs at the site of the driver outputs. The advantage of having disturbing radiation no longer at the site of the motor and on the motor lead wires, but only at the driver outputs, can be achieved only with the great circuit expenditure of providing one RLC filter for each driver output.

SUMMARY OF THE INVENTION

It is the object of the invention to provide an improved control circuit of the type which includes a commutation signal source controlled by rotational rotor position signals, a driver circuit controlled in accordance with the commutation signals and serving for applying driving pulses, which result in a rotating magnetic field, to the motor windings, with one driver stage being provided for each motor winding phase, and a pulse shaping circuit effecting sloping of the driving pulse edges, and more particularly to provide such a control circuit which renders possible the elimination of the disturbing electromagnetic radiation caused by the flyback pulses, while the circuit expenditure is reduced.

This object is met in that the pulse shaping circuit is arranged upstream of the driver circuit and is connected to an external edge sloping impedance means, and furthermore in that the driver stages are designed as feedback-free amplifier stages fed with driver control pulses that are sloped by means of the pulse shaping circuit.

By shifting the pulse shaping circuit into the integrated control circuit and by controlling the driver stages of the driver circuit with already sloped driver control pulses, it is no longer necessary to dispose RLC filters downstream of the driver outputs. The effect achieved by suitably dimensioning the edge sloping impedance means is that switching-off of the driver stage is effected only when the driver output current has dropped to 0 and when, thus, the magnetic field stored in the motor winding is eliminated completely. Flyback pulses and the related disturbing radiations thus cannot occur at all any more, either at the winding terminals or at the driver outputs.

Due to the fact that the shape of the edge slope of the driver control pulses is effected by an external edge sloping impedance means, the control circuit is flexible with respect to the adaptation of the shape of the driving pulses to different motors or types of operation.

Analogously controlled driver stages are usually designed in the form of feedback amplifier stages. For stabilization (frequency characteristic compensation) it is necessary to provide Boucherot members (RC networks) which are connected to the driver outputs. Due to the fact that the control circuit according to the invention makes use of driver stages that are designed as feedback-free amplifier stages or amplifier stages without feedback, such Boucherot members are not necessary.

Due to the fact that the pulse shaping circuit is disposed upstream of the driver circuit in the control circuit according to the invention, the sloped driver control pulses delivered by the pulse shaping circuit can be supplied to several or all driver stages for control thereof. Thus, it is not necessary any more to provide one edge sloping impedance means per driver stage, but a minimum of one single edge sloping impedance means for the entire control circuit is sufficient and.

Thus, the control circuit according to the invention requires a considerably lower external circuit expenditure than known control circuits, while nevertheless achieving the enormous advantage that flyback pulses and the concomitant disturbing radiations are avoided completely.

With the aid of a sinusoidal approximation of the driver control pulses, an optimum adaptation of the driving pulses to the sinusoidal motor voltage is achieved. However, for most applications it is sufficient to slope the driver control pulses in trapezoidal configuration, with a capacitor as an external edge sloping impedance component being sufficent therefor.

In a particularly preferred embodiment of the invention, the sloped driver control pulse for a particular motor phase is initiated substantially by the termination of the sloped driver control pulse for the respectively preceding motor phase. This means that, in the scope of the commutation clock predetermined by the commutation signals, the phase transitions are automatically controlled such that phase current overlapping is avoided.

In a further embodiment of the invention it is possible, by selection of the magnitude of the reference voltage, to have the phase shift between the driving pulses of two successive phases take place only when the driver output current for the respective preceding phase has decreased to 0 or substantially to 0.

It is particularly preferred to employ driver stages ecah having a source stage and a drain stage that are designed as independently controllable switches. The source stages, in the switched-on state, are adapted to be controlled analogously with the sloped driver control pulse. It is possible to achieve optimum correspondence between the switching-on times of the source and drain stages, respectively, by comparing of the sloped driver control pulses with the reference voltage to generate switching control signals for the source and drain stages, respectively.

A further embodiment of the invention provides the possibility of applying the sloped driver control pulses generated by the pulse shaping circuit to a plurality or to all driver stages, and of determining that driver stage which is to be controlled by the driver control pulse by switching-on of the source stage of said driver stage. It is then possible in the extreme case employ one single external edge sloping impedance means, and in the case of the trapezoidal pulse shaping operation it is possible to use one single external capacitor, which is possible independently of the number of the motor phases to be controlled.

In a particularly preferred embodiment, the source stage has an emitter follower cascade connected upstream thereof to the input of which are fed the driver control pulses whose amplitude depends on a motor control quantity. In the switched-on state of the source stage the driver output voltage is on the one hand caused to follow up the sloped edges of the driver control pulses in a feedback-free manner, i.e. in a manner without feedback, and is on the other hand controlled with respect to its amplitude in accordance with the motor control quantity. In this respect it is possible in a particularly preferred manner that the driver output can be blocked by the emitter follower cascade and the diode as long as the motor voltage exceeds the driver control pulse voltage present at the input of the emitter follower cascade by a predetermined value.

BRIEF DESCRIPTION OF THE DRAWINGS

The invention as well as further aspects of objectives and developments of the invention will be elucidated on the basis of an embodiment with reference to the drawings in which:

FIG. 3b shows signal patterns occurring in the circuit parts shown in FIG. 3a;

Like reference numerals are used for like component parts in the individual figures.

DESCRIPTION OF THE PREFERRED EMBODIMENT

Figure 1:
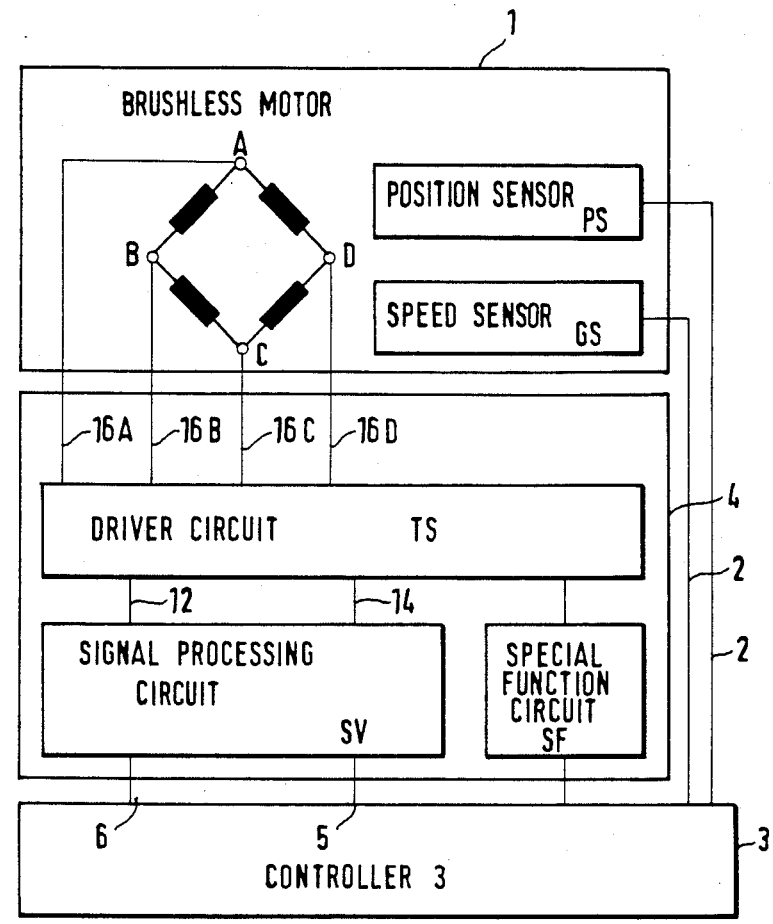
FIG. 1 shows a block diagram of a typical servo system with a brushless motor.

The servo system having a brushless or commutatorless four-phase motor, as it is shown in FIG. 1, has already been elucidated in the introductory part of the specification.

Figure 2:
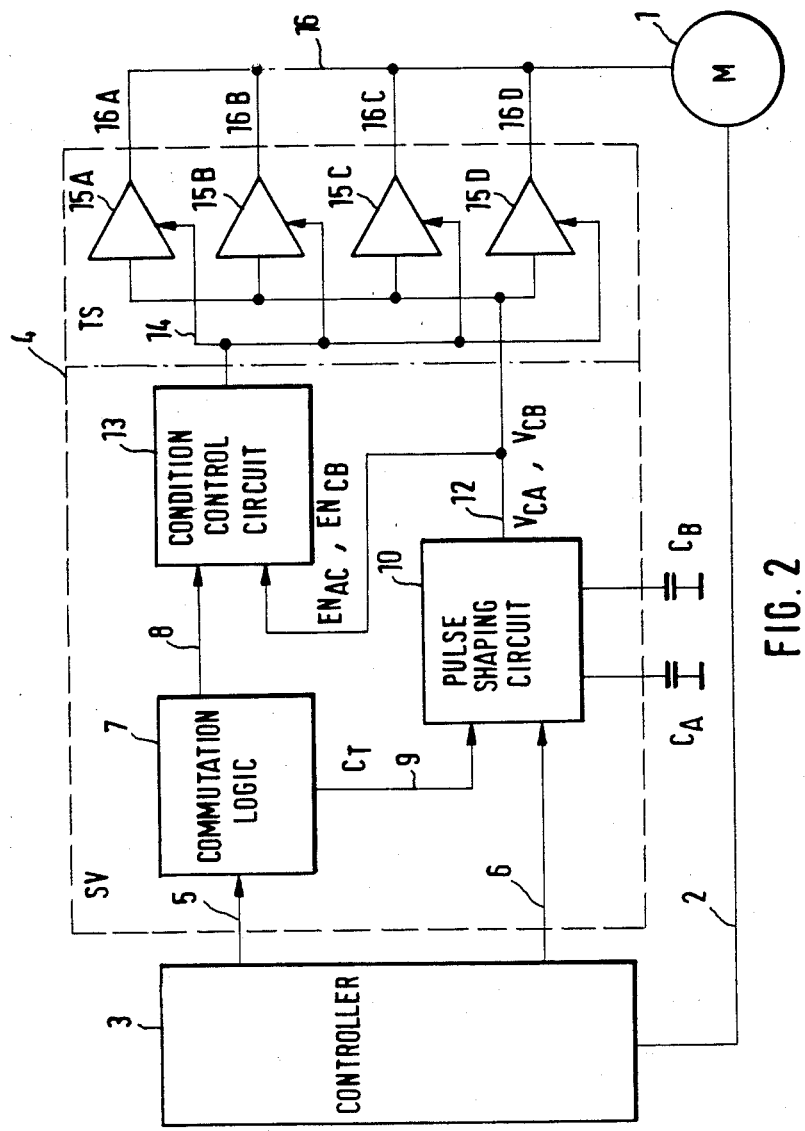
FIG. 2 shows a block diagram of such a servo system with a control circuit according to the invention.

FIG. 2 shows a block diagram presentation of such a servo system that is formed with a control circuit for a four-phase motor according to the invention. In FIG. 2 individual connecting lines between components of the servo system may represent multiple lines.

A motor 1 comprising a position sensor and a speed sensor, which are not shown in more detail in FIG. 1, supplies rotational rotor position signals and motor speed signals to the controller 3 via a (multiple) line 2. The controller 3 feeds, via lines 5 and 6, commutation signals and, respectively, a control signal to a signal processing circuit SV which belongs to the control circuit 4 and which, in turn, comprises a commutation logic 7, a pulse shaping circuit 10 and a condition or state control circuit 13. Under the control of the commutation signals the commutation logic 7 generates on the one hand commutation control signals fed via a line 8 to the condition control circuit, and on the other hand commutation time signals $C_T$ fed via a line 9 to the pulse shaping circuit 10. Under the control of the commutation time signals $C_T$ and of the control signal 6, the pulse shaping circuit 10 generates driver control pulses $V_{CA}$, $V_{CB}$ which are fed via a line 12 on the one hand to a first input of a driver circuit TS belonging to the control circuit 4, and on the other hand to an additional input of the condition control circuit 13. In accordance with the commutation control signals and the driver control pulses, the condition control circuit 13 generates switching control signals which are applied to an additional input of the driver circuit TS that is designed as a multiple input. The driver circuit TS contains four driver stages 15A, 15B, 15C, 15D each having an input for driver control pulses supplied by the pulse shaping circuit 10 and a double input for switching control signals supplied by the condition control circuit 13. The driver outputs 16A, 16B, 16C, 16D are connected to four winding connection points A, B, C, D of the motor 1, as they are shown in FIG. 1.

The control circuit 4, which is summarized in a block shown in broken lines, is a monolithically integrated circuit. The pulse shaping circuit 10 is connected to two capacitors $C_A$ and $C_B$ which are located outside of this broken-line block and, thus, are external and by means of which pulse sloping is achieved.

Figure 3A:
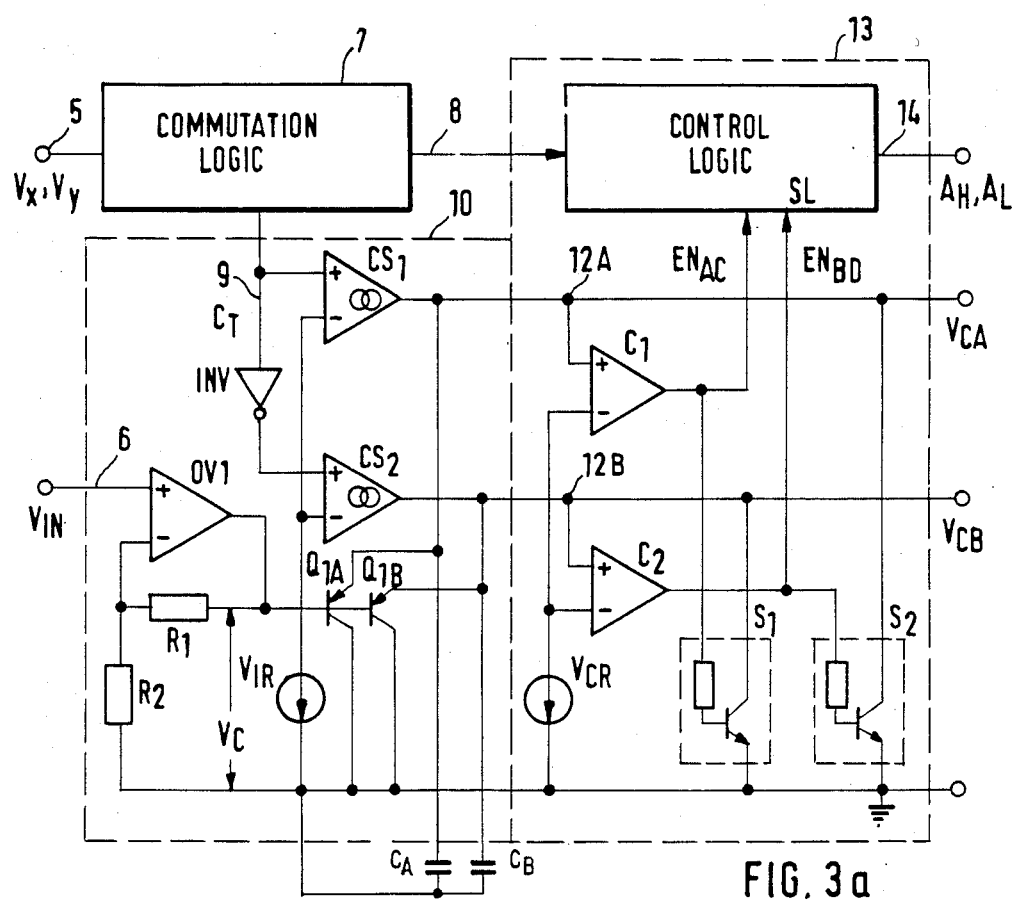
FIG. 3a shows circuit details of the pulse shaping circuit and of the condition control circuit of the control circuit contained in FIG. 2.
Figure 3B:
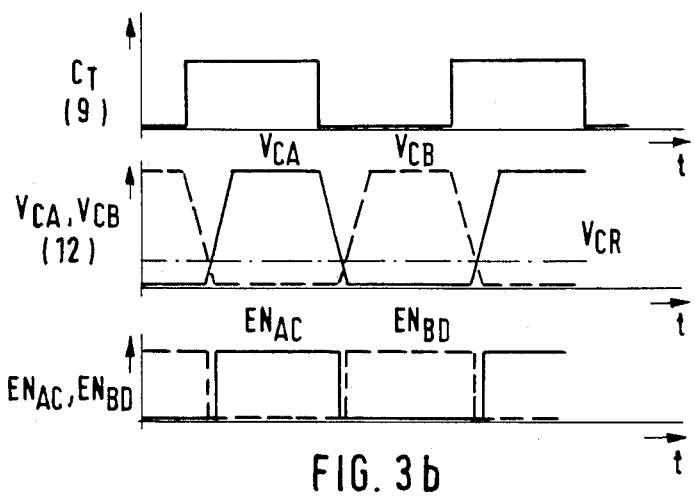

Details of the pulse shaping circuit 10 and of the condition control circuit 13 will now be elucidated on the basis of FIGS. 3a and 3b.

The pulse shaping circuit 10 contains two switchable bipolar current sources $CS_1$ and $CS_2$ whose initial current direction is dependent upon the particular switching condition which, in turn, is dependent upon the voltages across the inputs of the current sources. A capacitor $C_A$ is connected to the output of $CS_1$, and a capacitor $C_B$ is connected to the output of $CS_2$. The commutation time signals $C_T$ on line 9 are supplied to the non-inverting input of the current source $CS_1$ directly, and to the non-inverting input of the current source $CS_2$ via an inverter INV. The inverting inputs of both current sources $CS_1$ and $CS_2$ are connected to a first reference voltage source $V_{IR}$ having its other end connected to ground. The emitter-to-collector paths of a first limiting transistor $Q_{1A}$ and, respectively, of a second limiting transistor $Q_{1B}$ are connected in parallel to the capacitors $C_A$ and $C_B$, with the base terminals of said transistors being connected to the output of an operational amplifier $OV_1$. The inverting input of $OV_1$ is connected via a resistor $R_1$ to the output thereof, and via a resistor $R_2$ to ground. The non-inverting input of $OV_1$ receives via line 6 the control signal $V_{IN}$ delivered by the controller 3.

The condition control circuit 13 following the pulse shaping circuit comprises two comparators $C_1$ and $C_2$ whose inverting inputs are connected in common to a second reference voltage source $V_{CR}$ having its other end connected to ground. The non-inverting input of $C_1$ is connected to the output of $CS_1$, while the non-inverting input of $C_2$ is connected to the output of $CS_2$. A first controllable switch $S_1$ is connected in parallel to the capacitor $C_B$, i.e. between the output of $CS_2$ and ground, and the control circuit of said switch is connected to the output of the comparator $C_1$. A second controllable switch $S_2$ is connected in parallel to the capacitor $C_A$, i.e. between the output of $CS_1$ and ground, and the control terminal thereof is connected to the output of the comparator $C_2$. In the embodiment shown in FIG. 3 the switches $S_1$ and $S_2$ are each formed by an npn transistor whose collector-to-emitter paths are connected in parallel to the capacitor $C_B$ and $C_A$, respectively, and whose base terminals are each connected via a resistor to the output of $C_1$ and $C_2$ respectively.

On the line 12A connected to the output of $CS_1$ there appears a driver control pulse $V_{CA}$. On the line 12B connected to the output of $CS_2$ there appears a driver control pulse $V_{CB}$. On the outputs of the comparators $C_1$ and $C_2$ there are generated release pulses $EN_{AC}$ and $EN_{BD}$, respectively, which are supplied to two inputs of a control logic SL. In accordance with the release pulses $EN_{AC}$ and $EN_{BD}$ and the commutation control signals supplied by the commutation logic 7, the control logic SL generates on a multiple output 14 switching control signals $A_H$, $A_L$, ... which are fed to switching control terminals of the driver stages 15A to 15D of the driver circuit TS.

The mode of operation of the control circuit parts shown in FIG. 3a will be described in the following.

Depending on the current direction of the reversible or switchable current sources $CS_1$ and $CS_2$, the capacitors $C_A$ and $C_B$, respectively, are either charged with a constant current or discharged. The charging voltages of the capacitors $C_A$ and $C_B$ are limited by means of the limiting transistors $Q_{1A}$ and $Q_{1B}$, respectively, to maximum values which are higher, by the base-to-emitter voltages of these limiting transistors, than the control voltage $V_C$ at the output of $OV_1$ which is dependent on the control signal $V_{IN}$. Thus, across the capacitors $C_A$ and $C_B$ pulses $V_{CA}$ and $V_{CB}$, respectively, having sloped ascending and descending edges, are formed as illustrated in the middle of FIG. 3b. In this respect, $V_{CA}$ is shown with a curve pattern in full lines, and $V_{CB}$ is shown with a curve pattern in broken lines.

The upper part of FIG. 3b shows the commutation time signals $C_T$ of rectangular pulse shape. Due to the inverter INV the current sources $CS_1$ and $CS_2$ react, in a push-pull action, on the commutation time signals $C_T$. Therefore, the sloped driver control pulses $V_{CA}$ created across $C_A$ occur during the H (logically high) states, and the driver control pules $V_{CB}$ created across $C_B$ occur during the L (logically low) states of the commutation time signals $C_T$.

As shown by a comparison between the upper and the middle parts of FIG. 3b, the descending edges of $V_{CA}$ and $V_{CB}$ do indeed start at th pulse transitions of $C_T$. However, the ascending edges of $V_{CA}$ and $V_{CB}$ do not start at the corresponding pulse transitions of $C_T$, but start with a time delay with respect to these pulse transitions. This is achieved with the aid of the comparators $C_1$, $C_2$ and the switches $S_1$, $S_2$. When considering the state present at the left-hand end of FIG. 3b, one can see that $C_T$ is in the L state, $V_{CB}$ has its maximum value and $V_{CA}$ has the value 0. In the subsequent transition of $C_T$ into the H state, the current sources $CS_1$ and $CS_2$ are reversed, whereupon the discharge of the capacitor $C_B$ and thus the descending edge of the driver control pulse $V_{CB}$ start.

Along with the transition of $C_T$ into the H state, the current source $CS_1$ has been switched over as well, for the purpose of delivering a current for charging the capacitor $C_A$. However, an increase in the charging voltage of $C_A$ is still prevented in that the switch $S_2$ is switched into the conducting state and the line 12A is thus maintained approximately at ground potential. This is due to the fact that the charging voltage $V_{CB}$ of the capacitor $C_B$ is still higher than the reference voltage $V_{CR}$, which is shown in FIG. 3b in a dash-dot line. As long as $V_{CB}$ is greater than $V_{CR}$, the output of the comparator $C_2$ is in the H state, so that the transistor forming the switch $S_2$ is in the switched-on state.

As soon as the charging voltage $V_{CB}$ of the capacitor $C_B$ falls below the reference voltage $V_{CR}$, the output of the comparator $C_2$ changes to the L state, which results in blocking of the transistor forming the switch $S_2$. Starting from this moment of time, the voltage across the capacitor $C_A$ is allowed to rise, corresponding to the constant charging current delivered by the current source $CS_1$, until it reaches the maximum value that is dependent upon the control signal $V_{IN}$.

During the next pulse transition of $C_T$, discharging of the capacitor $C_A$ starts, resulting in the sloping descending edge of the driver control pulse $V_{CA}$. Until $V_{CA}$ has decreased to the reference voltage $V_{CR}$, the output signal of the comparator $C_1$ now keeps the switch $S_1$ in the conducting state, so that the voltage across the capacitor $C_b$ cannot increase, despite the charging current from the current source $C_2$, as long as $V_{CA}$ has not dropped below the reference voltage $V_{CR}$.

The beginning of the ascending edges of the driver control pulses $V_{CA}$ and $V_{CB}$ following each other in terms of time is, thus, always dependent approximately on the end of the descending edge of the respective preceding driver control pulse. With the aid of the amount of the reference voltage $V_{CR}$ it is possible to control how far the voltage value of the descending edge must have decreased so as to trigger the beginning of the respective successive driver control pulse.

The output signals of the comparators $C_1$ and $C_2$ at the same time constitute the release signals $EN_{AC}$ and $EN_{BD}$, respectively, which are fed to the control logic SL. Due to the fact that the output signals of the comparators $C_1$ and $C_2$ are dependent upon the moments of time at which the driver control pulses $V_{CA}$ and $V_{CB}$ fall below the reference voltage $V_{CR}$ respectively, the release pulses $EN_{AC}$ and $EN_{BD}$ are not in the same phase at the commutation time signal $C_T$. The time position of said release pulses relates to the points of intersection between the driver control pulse edges and the reference voltage $V_{CR}$. Between each two successive release pulses $EN_{AC}$ and $EN_{BD}$ there are short gaps. These gaps are identical with those periods of time at which both $V_{CA}$ and $V_{CB}$ are lower than the reference voltage $V_{CR}$.

Figure 4:
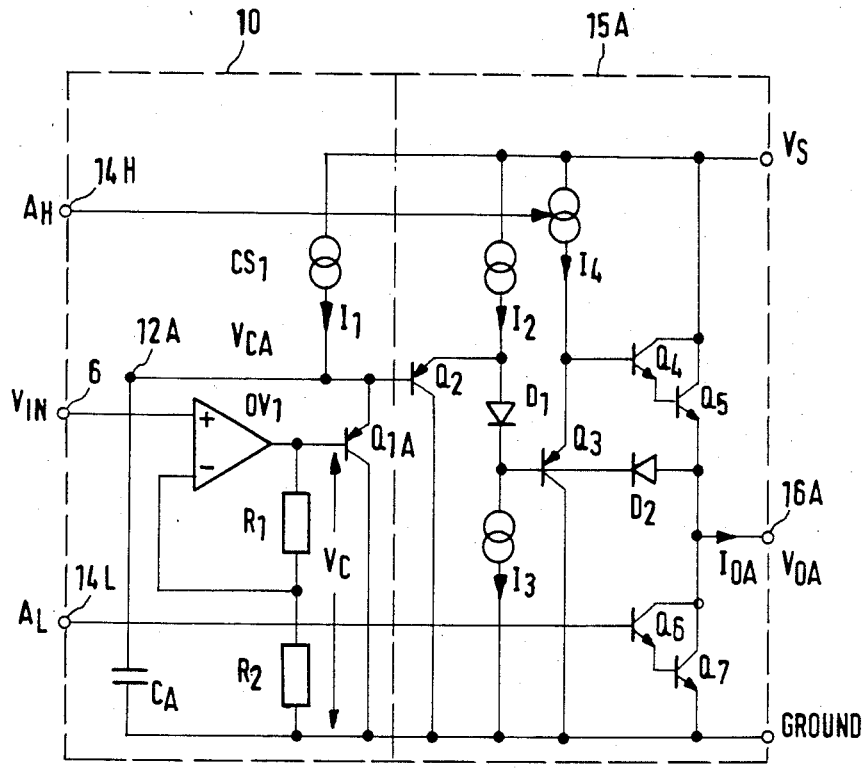
FIG. 4 shows circuit details of the pulse shaping circuit and of the driver circuit of the control circuit shown in FIG. 2.

FIG. 4 shows one of the driver stages 15 of the driver circuit TS as well as the interconnection thereof with the pulse shaping circuit 10. For providing more clarity, only the one capacitor $C_A$, the one limiting transistor $Q_{1A}$ and the one switchable current source $CS_1$ are shown of the pulse shaping circuit.

The driver stage 15 comprises a source stage having two Darlington transistors $Q_4$, $Q_5$, as well as a drain stage connected in series thereto and having two Darlington transistors $Q_6$, $Q_7$. The source stage is connected to a voltage source $V_S$, and the drain stage is connected to ground.

The point of connection of the source stage and the drain stage constitutes the output 16A of this driver stage.

The base of the transistor $Q_6$ receives a switching control signal $A_L$ from the control logic SL via a terminal 14L. The base of the transistor $Q_4$ is connected via a controllable current source $I_4$ to the voltage source $V_S$ and via the emitter-to-collector path of a transistor $Q_3$ to ground. The current source $I_4$ is controlled with switching control signals $A_H$ which are supplied thereto from the control logic SL via a terminal 14H.

The base of $Q_3$ is connected on the one hand via a series connection, consisting of a diode $D_1$ and a current source $I_2$, to the voltage source $V_S$, on the other hand via a current source $I_3$ to ground and, furthermore, via a diode $D_2$ to the driver output 16A. The connection point between the diode $D_1$ and the current source $I_2$ has the emitter of an additional transistor $Q_2$ connected thereto whose collector is connected to ground and whose base is fed with the sloped driver control pulses $V_{CA}$ as control voltage.

By means of the switching control signal $A_L$ the drain stage $Q_6$, $Q_7$ is switched on and off. By means of the switching control signal $A_H$ the source stage $Q_4$, $Q_5$ is switched on and off. In the switched-on state, the output voltage of the driver stage 15 is controlled analogously as a function of the path of the driver control pulse $V_{CA}$.

The mode of operation of the driver stage 15 will now be elucidated in the following.

The driver stage shown in FIG. 4 comprises a tri-state output. When the source stage $Q_4$, $Q_5$ is switched on, the output 16A is in the H state. When the drain stage $Q_6$, $Q_7$ is switched on, the output 16A is in the L state. When neither the source stage $Q_4$, $Q_5$ nor the drain stage $Q_6$, $Q_7$ is switched on, the output 16A has a high impedance.

Switching on of the source stage $Q_4$, $Q_5$ is effected by switching on the current source $I_4$ by means of the switching control signal $A_H$. The drain stage $Q_6$, $Q_7$ is switched on when the switching control signal $A_L$ is in the H state.

The driver output stage 15 thus is a push-pull output stage having source and drain stages that are controllable independently of each other. By controlling the two stages so that neither stage is in the conducting stage, the high-impedance tri-state condition is achieved.

When the source stage $Q_4$, $Q_5$ is switched into the conducting state, the output voltage at the output 16A can be controlled with the sloped driver control pulse $V_{CA}$ whose amplitude is dependent upon the control signal $V_{IN}$.

In the steady-state H (HIGH) condition $V_{CA}$ reaches the value $$V_{CA} = V_C + V_{BE1A}. \tag{1}$$

In this equation, $V_{BE1A}$ is the base-to-emitter voltage of the transistor $Q_{1A}$. The output voltage $V_{OA}$ at the output 16A is controlled via the emitter follower stages $Q_{1A}$, $Q_2$, $Q_3$, $Q_4$, $Q_5$ operating in a feedback-free loop, and via the diode $D_1$ effecting level shifting, with the aid of the control voltage $V_C$ appearing between the base of $Q_{1A}$ and ground. This holds when the source stage $Q_4$, $Q_5$ is switched on and supplies a current, i.e. when $$I_{OA} > 0. \quad (2)$$

The output voltage $V_{OA}$ as a function of the control voltage $V_C$ then is $$V_{OA} = V_C + V_{BE1A} + V_{BE2} + V_{BE3} - V_{D1} - V_{BE4} - V_{BE5}. \quad (3)$$

In this equation, $V_{BE2}$, $V_{BE3}$, $V_{BE4}$ and $V_{BE5}$ are the base-to-emitter voltages of the transistors $Q_2$, $Q_3$, $Q_4$ and $Q_5$, respectively, and $V_{D1}$ is the voltage across the diode $D_1$.

The transmission error between the control voltage $V_C$ and the output voltage $V_{OA}$ results as the offset voltage sum of the base-to-emitter voltages indicated in equation (3), and the diode voltage of $D_1$. This offset voltage sum is a function of the current and temperature difference of the components participating in the voltage transmission. The output voltage $V_{OA}$ thus changes in dependence upon the output current $I_{OA}$ and the temperature gradient. However, in the normal operating range, this change is below the resolution of the control system and thus does not influence the accuracy of the control operation.

When an external voltage (the emf voltage generated by the motor) is present at the output 16A that is higher than the control voltage $V_C$, the source stage blocks. For obtaining the output voltage $$V_{OA} \gtrsim V_C + V_{BE1A} + V_{BE2} - V_{D1} + V_{D2} \quad (4)$$

the diode $D_2$ is switched into the conducting state and the source stage is switched off. The current of the current source $I_3$, which flows in this state through the diode $D_2$, must be supplied by the external voltage source. The diode $D_1$ is then biased in the reverse or non-conducting direction, and the driver output 16A is therefore decoupled from the control voltage $V_C$ and from the driver control pulse voltage $V_{CA}$.

For controlling the four-phase motor shown in FIG. 1, the four driver stages co-operate in pairs. The driver stages 15A and 15C connected to the diagonal winding connection points A and C co-operate as a first driver stage pair and the driver stages 15B and 15D connected to the diagonally opposite connection points B and D co-operate as a second driver stage pair. The two pairs of driver stages are always activated alternatingly. Of each particular activated driver stage pair, the source stage of the one driver stage and the drain stage of the other driver stage are switched into the conducting state. The driver stages of the particular non-activated driver stage pair are in the high-impedance state or tristate condition. In their successive activation phases, the individual driver stages alternate between switching the source stage into the conducting state and switching the drain stage into the conducting state. The control logic SL determines in which one of the four driver stages the source stage, the drain stage or no stage at all is switched on respectively.

On the basis of FIG. 5b, the effect of the measures according to the invention will now be described.

Figure 5A:
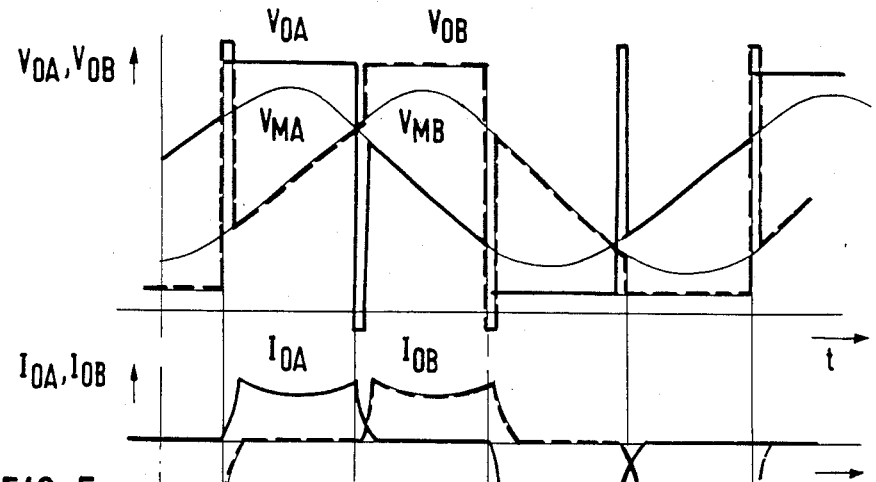
FIG. 5a shows voltage and current patterns in a conventional circuit.
Figure 5B:
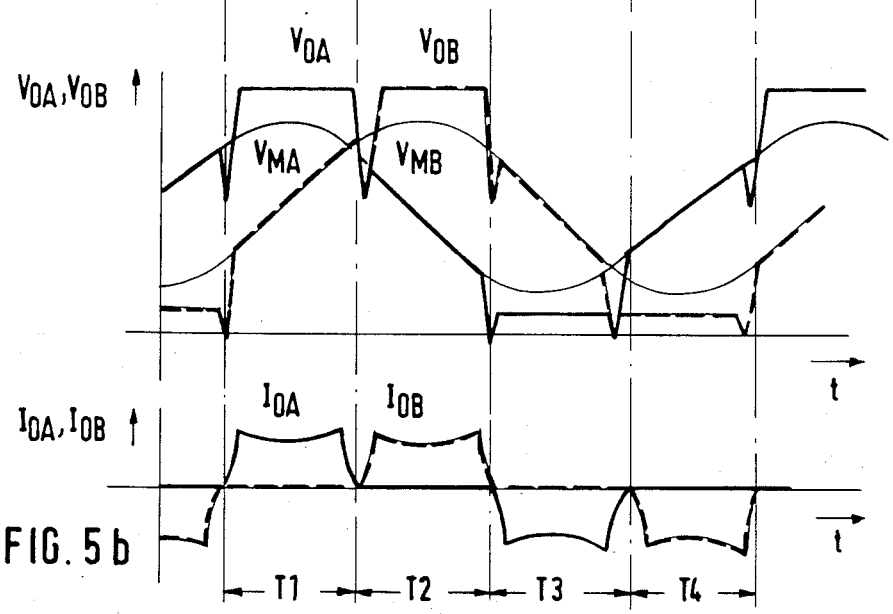
FIG. 5b shows voltage and current patterns in a control circuit according to the invention.

The upper part of FIG. 5b shows the voltages $V_{OA}$ and $V_{OB}$ at the outputs of the driver stages 15A and 15B for four successive commutation clock periods $T_1$ to $T_4$. The lower part of FIG. 5b indicates the associated output currents $I_{OA}$ and $I_{OB}$ of the driver outputs 16A and 16B.

During the commutation clock period $T_1$ the source stage of the driver stage 15A and the drain stage of the driver stage 15C are switched on. During this switching stage the source stage of the driver circuit 15A is controlled anologously by the voltage of the sloped driver control pulse $V_{CA}$. During this commutation clock period the driver outputs 16B and 16D are in the not switched-on, high-impedance state.

As soon as the ascending edge of $V_{CA}$ has reached such a voltage value with respect to the external motor voltage active on the driver output 16A that the diode $D_2$ no longer blocks the source stage, the output voltage $V_{OA}$ follows the voltage pattern of the driver control pulse $V_{CA}$. At the end of the commutation clock period the driver output voltage $V_{OA}$ begins to decrease correspondingly to the sloping descending edge of $V_{CA}$. The amount of sloping or the gradient of the descending edge of $V_{OA}$ is adjusted by the capacitor $C_A$ and the current source $CS_1$ in such a manner that the output current $I_{OA}$ has already dropped to zero when the source stage of the driver stage 15A is switched off again with the aid of the diode $D_2$ since the motor voltage at the output 16A is again above the driver control pulse voltage by the value determined by the emitter follower cascade. Due to the fact that a driver current does not flow any more at this moment of switching-off, a flyback pulse caused by switching-off cannot occur, either.

The same applies correspondingly when in the successive commutation clock period $T_2$ the driver output 16B is switched on and off. In the commutation clock period $T_3$, the drain stage of the driver stage 15A and the source stage of the driver stage 15C are switched on, the source stage of 15C is controlled analogously with the sloped driver control pulse $V_{CA}$.

Due to the fact that, according to FIG. 3b, the beginning of the ascending edge of each driver control pulse $V_{CA}$, $V_{CB}$ and the release signals $EN_{AC}$, $EN_{BD}$ controlling the switching control signals $A_H$, $A_L$, ... can start only when the descending edge of the particular terminating driver control pulse has dropped below the reference voltage $V_{CR}$, which is selected such that the associated driver output current has decreased to 0 when the driver control pulse falls below $V_{CR}$, overlapping of the driver output currents $I_{OA}$ and $I_{OB}$ does not occur in FIG. 5b. Rather, the driver current at a driver output starts to flow only when the driver current at the phase-preceding output has decreased substantially to 0.

Thus, with the aid of an extremely low circuit expenditure, viz. by means of only two external capacitors, the disturbing flyback pulses of known control circuits have been overcome. The external circuit expenditure may even be further reduced by employing only one single external capacitor and by offering the driver control pulses derived from the charging voltage of this capacitor not only to two but to all driver stages. This necessitates only a slightly higher circuit expenditure within the monolithically integrated control circuit. However, this is practically without significance since the additional circuit expenditure makes itself felt only at the time of the design of the integrated circuit.

What is claimed is:

1. A monolithically integrable control circuit for a brushless DC motor comprising:
   a commutation signal source for producing motor commutation signals, the commutation signal source being controlled by rotational rotor position signals, a driver circuit controlled in accordance with the commutation signals and serving for applying driving pulses, which result in a rotating magnetic field, to the motor windings, with one driver stage being provided for each motor winding phase, and a pulse shaping circuit which effects sloping of the driving pulse edges, the pulse shaping circuit being connected to the driver circuit to provide drive control pulses thereto and additionally being connected to an external edge sloping impedance means for sloping the edges of the driver control pulses, wherein a sloped driver control pulse ($V_{CA}$, $V_{CB}$) for a particular motor phase is initiated substantially by the termination of a sloped driver control pulse ($V_{CA}$, $V_{CB}$) for the preceding motor phase, and wherein the driver stages (15) are designed as feedback-free amplifier stages, each including a source stage ($Q_4$, $Q_5$) supplying current into a connected motor winding, and a drain stage ($Q_6$, $Q_7$) receiving current from the connected motor winding, with the source stage ($Q_4$$Q_5$) and the drain stage ($Q_6$, $Q_7$) being controllable independently of each other, with the drain stage ($Q_6$, $Q_7$) being designed as a switch and the source stage ($Q_4$, $Q_5$) having a conductive stage wherein it is controllable analogously with said sloped driver control pulse ($V_{CA}$, $V_{CB}$), so that the output voltage of the driver stages (15) is controllable with the sloped driver control pulses ($V_{CA}$, $V_{CB}$) and a voltage corresponding to said sloped river control pulse ($V_{CA}$, $V_{CB}$) is thus applied to the particular activated motor winding.

2. A control circuit according to claim 1, wherein the edge sloping impedance means comprises at least one external capacitor ($C_A$, $C_B$) which, in cooperation with a switchable current source circuit ($CS_1$, $CS_2$) controlled by said commutation signals ($C_t$), effects substantially trapezoidal driver control pulses.

3. A control circuit according to claim 2, wherein the current source circuit provided in the pulse shaping circuit (10) comprises two switchable bipolar current sources ($CS_1$, $CS_2$) each having an external capacitor ($C_A$, $C_B$) connected thereto and the current directions thereof being switched over in push-pull manner in accordance with said commutation signals ($C_T$), and wherein each capacitor ($C_A$, $C_B$) has an amplitude limiting circuit ($Q_{1A}$, $Q_{1B}$) connected therewith to provide a current limiting threshold.

4. A control circuit according to claim 3, wherein the limiting threshold of the amplitude limiting circuit ($Q_{1A}$, $Q_{1B}$) is controllable in accordance with a motor control signal.

5. A control circuit according to claim 4, wherein the amplitude limiting circuit comprises two transistors ($Q_{1A}$, $Q_{1B}$) whose main current paths are each connected in parallel to one of the two external capacitors ($C_A$, $C_B$) and whose control terminals are fed with a limitation, control signal ($V_C$) depending on the motor control signal.

6. A control circuit according to claim 5, wherein the source stage ($Q_4$, $Q_5$) of each driver stage (15) has a source blocking circuit ($Q_{1A}$, $Q_2$, $D_1$, $Q_3$, $D_2$) associated therewith which, when the external charging voltage present at the output of the driver stage (15) exceeds the driver control pulse voltage by a predetermined amount, blocks the switched-on source stage ($Q_4$, $Q_5$) and thereby decouples the driver stage output from the driver control pulse ($V_{CA}$, $V_{CB}$).

7. A control circuit according to claim 3, wherein each of the two external capacitors ($C_A$, $C_B$) has a controllable switch ($S_1$, $S_2$) connected in parallel thereto whose switching condition is controlled by the output signal of a comparator ($C_1$, $C_2$) which compares the charging voltage of the other capacitor ($C_A$, $C_B$) with a reference voltage ($V_{CR}$) and switches the switch ($S_1$, $S_2$) controlled by said comparator into the conducting state when the charging voltage of the other capacitor ($C_A$, $C_B$) is equal to or greater than the reference voltage ($V_{CR}$).

8. A control circuit according to claim 7, further comprising a control logic circuit (SL) which generates switching control signals ($A_H$, $A_L$) under control of output signals ($EN_{AC}$, $EN_{BD}$) of the comparators ($C_1$, $C_2$).

9. A control circuit according to claim 1, wherein the initiation of the sloped driver control pulse ($V_{CA}$, $V_{CB}$) for the particular motor phase is caused in that the voltage of the sloped driver control pulse ($V_{CA}$, $V_{CB}$) for the respectively preceding motor phase falls below a reference voltage ($V_{CR}$), with the reference voltage ($V_{CR}$) being lower than that voltage value of the descending edge of the sloped driver control pulses ($V_{CA}$, $V_{CB}$) at which the driver output current has decreased substantially to 0.

10. A control circuit according to claim 1, wherein between the pulse shaping circuit (10) and the driver circuit there is connected a condition control circuit (13) which, by comparison of the sloped driver control pulses ($V_{CA}$, $V_{CB}$) with a reference voltage ($VC_R$), generates switching control signals ($A_H$, $A_L$) for the source stages ($Q_4$, $Q_5$) and the drain stages ($Q_6$, $Q_7$) of the driver circuit.

11. A control circuit according to claim 10, wherein the commutation required for the generation of the rotating magnetic field is effected by the condition control circuit (13) by driving the driver stages (15) in pairs in such a manner that the source stage ($Q_4$, $Q_5$) of one driver stage (15) and the drain stage ($Q_6$, $Q_7$) of the other driver stage (15) of the respective pair are switched on simultaneously.

12. A control circuit according to claim 1, wherein the sloped driver control pulses ($V_{CA}$, $V_{CB}$) are applied to the control inputs of a plurality of driver stages (15) and the selection of that driver stage (15) which is controlled analogously by a particular sloped driver control pulse ($V_{CA}$, $V_{CB}$) is effected by switching-on of the source stage ($Q_4$, $Q_5$) thereof.

13. A control circuit according to claim 1, wherein the amplitude of the driving pulses is controlled in accordance with an analog motor control signal.

14. A control circuit according to claim 13, wherein the motor control signal is a function of the motor speed.

15. A control circuit according to claim 1, wherein the source stage ($Q_4$, $Q_5$) of each driver stage (15) is connected to an emitter follower cascade ($Q_{1A}$, $Q_2$, $Q_3$, $Q_4$, $Q_5$) via which the driver output voltage is controlled when the source stage ($Q_4$, $Q_5$) is switched on.

16. A control circuit according to claim 15, wherein the source stage ($Q_4$, $Q_5$) and the drain stage ($Q_6$, $Q_7$) are each formed by a Darlington circuit and the Darlington circuit ($Q_4$, $Q_5$) of the source stage forms part of the emitter follower cascade.

17. A control circuit for a brushless DC motor having a rotor and having a plurality of motor coils which are connected in a loop at coil connection points, comprising:

feedback means, operatively connected to the motor, for generating rotational rotor position signals;

controller means, responsive to the rotational rotor position signals, for generating a commutation signal;

signal processing means, responsive to the commutation signal, for generating switching control signals and at least one pulse train having substantially trapezoidally shaped driver control pulses; and driver means, responsive to the switching control signals and the at least one pulse train, for driving the motor coils to generate a rotating magnetic field within the motor, the driver means including at least one driver stage having a tri-state output port that is connected to a respective one of the coil connection points, first and second power supply ports for receiving electrical power to drive the motor, a source stage connected between the first power supply port and the output port, a drain stage connected between the second power supply port and the output port, means responsive to the switching control signals for selectively rendering the source and drain stages conductive, not more than one of the source and drain stages being substantially conductive at any time, and means for controlling the current through one of the source and drain stages when it is conductive so that the current varies as a function of the driver control pulse.

18. A control circuit according to claim 17, wherein the motor has four motor coils which are connected at four coil connection points, wherein the signal processing means generates two pulse trains having trapezoidally shaped driver control pulses, the pulse trains being displaced in phase, and wherein the driver means comprises two pairs of driver stages, each receiving said switching control signals and said driver control pulses, with current flowing through only one of the pairs of driver stages at a time.

19. A control circuit according to claim 18, wherein the feedback means additionally comprises means for generating a motor speed signal, wherein the controller means is additionally responsive to the motor speed signal and further comprises means for generating an amplitude control signal, and wherein the signal processing means is additionally responsive to the amplitude control signal and further comprises means for controlling the height of the driver control pulses as a function of the amplitude control signal.

20. A control circuit according to claim 19, wherein the signal processing means comprises two capacitors and means for charging and discharging the two capacitors.

21. A control circuit according to claim 20, wherein the driver means and the signal processing means, except for the two capacitors, are provided on an integrated circuit.

22. A control circuit according to claim 17, wherein the means for controlling the current through one of the source and drain stages controls current through the source stage, and wherein the source stage comprises a feedback-free amplifier.

* * * * *